United States Patent [19]
Scott et al.

[11] Patent Number: 6,011,124
[45] Date of Patent: Jan. 4, 2000

[54] BLENDS OF BISPHENOL A POLYCARBONATE AND POLYESTERS

[75] Inventors: Christopher Edward Scott, Cambridge, Mass.; John C. Morris; James Rodney Bradley, both of Kingsport, Tenn.

[73] Assignee: Eastman Chemical Company, Kingsport, Tenn.

[21] Appl. No.: 08/997,433

[22] Filed: Dec. 23, 1997

Related U.S. Application Data

[60] Provisional application No. 60/034,991, Dec. 28, 1996.
[51] Int. Cl.$^7$ .................................................. C08G 63/40
[52] U.S. Cl. ........................................... 525/439; 525/466
[58] Field of Search ..................................... 525/439, 466

[56] References Cited

U.S. PATENT DOCUMENTS

| | | | |
|---|---|---|---|
| 3,301,777 | 1/1967 | Leonard | 204/290 |
| 3,313,777 | 4/1967 | Elam et al. | 260/47 |
| 3,772,405 | 11/1973 | Hamb | 260/860 |
| 4,188,314 | 2/1980 | Fox et al. | 260/37 PC |
| 4,263,364 | 4/1981 | Seymour et al. | 428/287 |
| 4,267,096 | 5/1981 | Bussink et al. | 260/40 R |
| 4,391,954 | 7/1983 | Scott | 525/439 |
| 4,585,854 | 4/1986 | Tung et al. | 528/295 |
| 4,619,976 | 10/1986 | Morris et al. | 525/439 |
| 4,645,802 | 2/1987 | Jackson, Jr. et al. | 525/419 |
| 4,786,692 | 11/1988 | Allen et al. | 525/439 |
| 5,034,457 | 7/1991 | Serini et al. | 525/67 |
| 5,104,723 | 4/1992 | Freitag et al. | 428/220 |
| 5,137,970 | 8/1992 | Eckel et al. | 525/67 |
| 5,145,911 | 9/1992 | Eckel et al. | 525/67 |
| 5,310,793 | 5/1994 | Freitag et al. | . |
| 5,342,819 | 8/1994 | Takiguchi et al. | . |
| 5,461,120 | 10/1995 | Mason et al. | . |
| 5,808,344 | 4/1996 | Mason et al. | 525/65 |

OTHER PUBLICATIONS

Coover, Jr. et al., *Copolyester Molding Composition*, United States Patent Office, Defensive Publication T875,010, published Jun. 9, 1970 (875 O.G. 842).

*Primary Examiner*—Robert Dawson
*Assistant Examiner*—D. Aylward
*Attorney, Agent, or Firm*—Needle & Rosenberg, P.C.

[57] ABSTRACT

Disclosed are clear blends comprising:

(A) from 1 to 99 percent by weight of a polycarbonate comprising a diol component comprising from 90 to 100 mol percent 4,4'-isopropylidenediphenol units and from 0 to 10 mol percent modifying diol units having 2 to 16 carbons, wherein the total mol percent of diol units is equal to 100 mol percent; and (B) from 1 to 99 percent by weight of a polyester comprising (a) a dicarboxylic acid component comprising from 80 to 100 mol percent dicarboxylic acid units selected from the group consisting of terephthalic acid units, isophthalic acid units, and mixtures thereof; and from 0 to 20 mol percent modifying dicarboxylic acid units having about 2 to 20 carbons, wherein the total mol percent of dicarboxylic acid units is equal to 100 mol percent; and (b) a glycol component comprising from 30 to 99 mol percent 2,2,4,4-tetramethyl-1,3-cyclobutanediol units, from 1 to 70 mol percent ethylene glycol units, and from 0 to 10 mol percent modifying glycol units having from 3 to 16 carbons, wherein the total mol percent of glycol units is equal to 100 mol percent;

wherein the total units of said polyester is equal to 200 mol percent;

wherein said blend is clear and the total weight percent of said polycarbonate (A) and said polyester (B) is equal to 100 weight percent.

21 Claims, No Drawings

BLENDS OF BISPHENOL A POLYCARBONATE AND POLYESTERS

CROSS-REFERENCE TO RELATED APPLICATIONS

This application claims priority to U.S. provisional application Ser. No. 60/034,991, filed Dec. 28, 1996, and the 60/034,991 application has been incorporated by this reference in its entirety.

FIELD OF THE INVENTION

The present invention relates to blends of polycarbonates and polyesters that are unexpectedly clear and miscible. More particularly, the present invention relates to clear miscible blends of the polycarbonate of bisphenol A and polyesters from aromatic dicarboxylic acids, ethylene glycol, and 2,2,4,4-tetramethyl-1,3-cyclobutanediol.

BACKGROUND OF THE INVENTION

The polycarbonate of 4,4'-isopropylidenediphenol (bisphenol A polycarbonate) is a well known engineering molding plastic. Bisphenol A polycarbonate is a clear high-performance plastic having good physical properties such as dimensional stability, high heat resistance, and good impact strength. Although bisphenol A polycarbonate has many good physical properties, its relatively high melt viscosity leads to poor melt processability and the polycarbonate exhibits poor chemical resistance.

Blends display different physical properties based upon the nature of the polymers blended together as well as the concentration of each polymer in the blend. Attempts have been made to blend bisphenol A polycarbonate with other polymers that have good chemical resistance, processability, and machinability. These attempts to improve melt processability, chemical resistance and other physical properties of bisphenol A polycarbonate have been made by blending bisphenol A polycarbonate with polymers such as polystyrene, elastomers, polyesters, and polyesterimides. However, blends of bisphenol A polycarbonate with other polymeric materials have usually resulted in immiscible blend compositions. Immiscible blend compositions are inadequate for many uses because they are not clear.

Clear, miscible blends of any two polymers are rare. The term "miscible" refers to blends that are a mixture on a molecular level wherein intimate polymer-polymer interaction is achieved. Miscible blends are clear, not translucent or opaque. In addition, differential scanning calorimetry testing detects only a single glass transition temperature (Tg) for miscible blends composed of two or more components.

There have been very few clear polycarbonate/polyester blends developed. U.S. Pat. Nos. 4,619,976 and 4,645,802 disclose clear blends based on bisphenol A polycarbonate with polyesters of poly(1,4-tetramethylene terephthalate), poly(1,4-cyclohexylenedimethylene terephthalate) and selected copolyesters and copoly(esterimides) of poly(1,4-cyclohexylenedimethylene terephthalate). U.S. Pat. No. 4,786,692 discloses clear blends of bisphenol A polycarbonate and polyesters of terephthalic acid, isophthalic acid, ethylene glycol, and 1,4-cyclohexanedimethanol. U.S. Pat. Nos. 4,188,314 and 4,391,954 disclose clear blends of bisphenol A polycarbonate with poly(1,4-cyclohexylenedimethylene terephthalate-co-isophthalate). These polyester blends do have improved chemical resistance and melt processability, when compared to unblended bisphenol A polycarbonate. However, the good heat resistance and impact strength of bisphenol A polycarbonate blends based on these compositions is reduced significantly.

In light of the above it would be very desirable to have a new clear polymer blend based upon bisphenol A polycarbonate having improved melt processability and good chemical resistance, while retaining good heat resistance and excellent impact strength. Such blend would be especially suitable for the manufacture of clear molded articles, fibers, sheeting, and film.

SUMMARY OF THE INVENTION

In one embodiment, the blend composition according to the present invention comprises:

(A) about 1 to 99 percent by weight of a polycarbonate comprising a diol component comprising about 90 to 100 mol percent 4,4'-isopropylidenediphenol units and 0 to about 10 mol percent modifying diol units having 2 to 16 carbons, wherein the total mol percent of diol units is equal to 100 mol percent; and (B) about 1 to 99 percent by weight of a polyester comprising (a) a dicarboxylic acid component comprising about 80 to 100 mol percent dicarboxylic acid units selected from the group consisting of terephthalic acid units, isophthalic acid units, and mixtures thereof; and 0 to about 20 mol percent modifying dicarboxylic acid units having about 2 to 20 carbons, wherein the total mol percent of dicarboxylic acid units is equal to 100 mol percent; and (b) a glycol component comprising about 30 to 100 mol percent 2,2,4,4-tetramethyl-1,3-cyclobutanediol units, 0 to about 70 mol percent ethylene glycol units, and 0 to about 10 mol percent modifying glycol units having 3 to 16 carbons, wherein the total mol percent of glycol units is equal to 100 mol percent;

wherein the total units of said polyester is equal to 200 mol percent;

wherein said blend is clear and the total weight percent of said polycarbonate (A) and polyester (B) is equal to 100 weight percent.

In another embodiment, the invention comprises:

(A) from 1 to 99 percent by weight of a polycarbonate comprising a diol component comprising from 90 to 100 mol percent 4,4'-isopropylidenediphenol units and from 0 to 10 mol percent modifying diol units having 2 to 16 carbons, wherein the total mol percent of diol units is equal to 100 mol percent; and (B) from 1 to 99 percent by weight of a polyester comprising (a) a dicarboxylic acid component comprising from 80 to 100 mol percent dicarboxylic acid units selected from the group consisting of terephthalic acid units, isophthalic acid units, and mixtures thereof; and from 0 to 20 mol percent modifying dicarboxylic acid units having about 2 to 20 carbons, wherein the total mol percent of dicarboxylic acid units is equal to 100 mol percent; and (b) a glycol component comprising from 30 to 99 mol percent 2,2,4,4-tetramethyl-1,3-cyclobutanediol units, from 1 to 70 mol percent ethylene glycol units, and from 0 to 10 mol percent modifying glycol units having from 3 to 16 carbons, wherein the total mol percent of glycol units is equal to 100 mol percent;

wherein the total units of said polyester is equal to 200 mol percent;

wherein said blend is clear and the total weight percent of said polycarbonate (A) and said polyester (B) is equal to 100 weight percent.

The invention also covers a method of making a clear article from the blend composition of the invention comprising the steps of:

(a) blending polycarbonate (A) and polyester (B);
(b) before, during or after the blending, melting polycarbonate (A) and polyester (B) to form after the blending and melting, a melt blend;
(c) then cooling the melt blend to form a clear blend composition

DETAILED DESCRIPTION OF THE INVENTION

The present invention may be understood more readily by reference to the following detailed description of preferred embodiments of the invention and the Examples included therein.

Before the present compositions of matter are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification, the singular forms "a", "an" and "the" include plural referents unless the context clearly dictates otherwise.

The applicants were surprised to discover clear blends of bisphenol A polycarbonate and particular polyesters from terephthalic acid, isophthalic acid, 2,2,4,4-tetramethyl-1,3-cyclobutanediol, and ethylene glycol. This discovery was particularly surprising since there are no teachings of a polycarbonate/polyester blend having a 2,2,4,4-tetramethyl-1,3-cyclobutanediol based glycol component in the polyester. Further, there are no teachings suggesting that such a blend may be clear. Although U.S. Pat. No. 3,301,777 discloses polyesters containing 2,2,4,4-tetramethyl-1,3-cyclobutanediol, there is no suggestion of the benefit of blending a 2,2,4,4-tetramethyl-1,3-cyclobutanediol based polyester with a polycarbonate.

In addition to the unexpected clarity of the blend, the applicants were also surprised to find that the polyester portion of the present invention provides excellent impact strength and good heat resistance to the polymer blend.

The term "polycarbonate" is herein defined as the condensation product of a carbonate source and a diol source, having a carbonate component containing 100 mol percent carbonate units and a diol component containing 100 mol percent diol units, for a total of 200 mol percent monomeric units. The term "diol" as used herein, includes both aliphatic and aromatic compounds having two hydroxyl groups, while the term "glycol" refers to aliphatic and aromatic/aliphatic compounds having two hydroxyl groups.

The polycarbonate portion of the blend of the present invention is based upon the polycarbonate of 4,4'-isopropylidenediphenol, commonly known as bisphenol A polycarbonate, shown below as compound I.

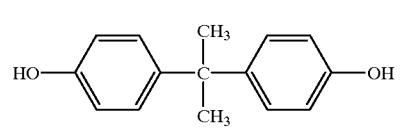

(I)

Suitable examples of commercially available bisphenol A polycarbonate include LEXAN, from General Electric, and MAKROLON, from Miles, Inc.

The polycarbonate portion of the present blend has a diol component containing about 90 to 100 mol percent bisphenol A units, wherein the total mol percent of diol units is 100 mol percent. 0 to about 10 mol percent of the diol component of the polycarbonate portion can be substituted with units of other modifying aliphatic or aromatic diols, besides bisphenol A, having from 2 to 16 carbons. It is preferable to have at least 95 mol percent of diol units in the polycarbonate being bisphenol A, more preferably 100 mol percent. Suitable examples of modifying aromatic diols include the aromatic diols disclosed in U.S. Pat. Nos. 3,030,335 and 3,317,466.

The inherent viscosity of the polycarbonate portion of the blends according to the present invention is preferably at least about 0.3 dL/g, more preferably at least 0.5 dL/g, determined at 25° C. in 60/40 wt/wt phenol/tetrachloroethane.

The term "polyester", as used herein, refers to any unit-type of polyester falling within the scope of the polyester portion of the present blend, including but not limited to homopolyesters, copolyesters, and terpolyesters. The polyester portion of the blend of the present invention comprises a dicarboxylic acid component of about 80 to 100 mol percent terephthalic acid and/or isophthalic acid units, and 0 to about 20 mol percent modifying dicarboxylic acid units, and a glycol component of about 30 to 100 mol percent 2,2,4,4-tetramethyl-1,3-cyclobutanediol units, 0 to about 70 mol percent ethylene glycol units, and 0 to about 10 mol percent modifying glycol units, wherein the total dicarboxylic acid units is equal to 100 mol percent, the total glycol units is equal to 100 mol percent, with a total polyester units equal to 200 mol percent.

Terephthalic acid and isophthalic acid have been found to be the preferred primary dicarboxylic acids for providing a polyester that when blended with bisphenol A polycarbonate is clear. A higher concentration of terephthalic acid in the polyester than isophthalic acid is preferred because terephthalic acid produces a polyester that provides greater impact strength to the blend. Therefore, it is preferred that the dicarboxylic acid component of the polyester portion be 50 to 100 mol percent terephthalic acid and 0 to 50 mol percent isophthalic acid, more preferably 70 to 100 mol percent terephthalic acid and 0 to 30 mol percent isophthalic acid, with about 100 mol percent terephthalic acid being most preferred.

In addition to terephthalic acid and isophthalic acid, the dicarboxylic acid component of the polyester can be substituted with up to 20 mol percent, but preferably less than 10 mol percent of other modifying dicarboxylic acids having 2 to 20 carbon atoms. Suitable examples of modifying aromatic dicarboxylic acids include 4,4'-biphenyldicarboxylic acid, 1,4-, 1,5-, 2,6-, 2,7-naphthalenedicarboxylic acid, 4,4'-oxybenzoic, trans-4,4'-stilbenedicarboxylic acid, or mixtures thereof. Suitable examples of modifying aliphatic dicarboxylic acids are those containing 2 to 12 carbon atoms, such as oxalic, malonic, succinic, glutaric, adipic, pimelic, suberic, azelaic, and sebacic acids, or mixtures thereof.

The dicarboxylic acid component of the polyester portion of the present blend can be prepared from dicarboxylic acids, their corresponding esters, or mixtures thereof. Examples of esters of the dicarboxylic acids useful in the present invention include the dimethyl, dipropyl, diisopropyl, dibutyl, and diphenyl esters, and the like.

The glycol component of the polyester portion of the present blend is formed from about 30 to 100 mol percent of 2,2,4,4-tetramethyl-1,3-cyclobutanediol units, 0 to 70 mol percent of ethylene glycol units, and 0 to about 10 mol percent modifying glycol units containing 3 to 16 carbons. About 30 to 90 mol percent 2,2,4,4-tetramethyl-1,3-cyclobutanediol units and about 10 to 70 mol percent ethylene glycol units preferably form the polyester glycol component, more preferably 30 to 80 mol percent 2,2,4,4-tetramethyl-1,3-cyclobutanediol units and about 20 to 70 mol percent 1,4-cyclohexanedimethanol units, even more preferably about 30 to 60 mol percent 2,2,4,4-tetramethyl-1,3-cyclobutanediol units and about 40 to 70 mol percent ethylene glycol units, even further more preferably about 34 to 55 mol percent 2,2,4,4-tetramethyl-1,3-cyclobutanediol units and about 45 to 66 mol percent ethylene glycol units, with about 35 to 50 mol percent 2,2,4,4-tetramethyl-1,3-cyclobutanediol units and about 50 to 65 mol percent ethylene glycol units being most preferable. In one embodiment, the ethylene glycol units comprise 1% of the glycol component of the polyester portion of the blend.

The 2,2,4,4-tetramethyl-1,3-cyclobutanediol can be cis, trans, or a mixture thereof, preferably 45–55 mol percent trans, where the total of cis and trans isomer content is equal to 100 mol percent, more preferably the isomer ratio is about 50/50 trans/cis. A glycol component having at least 30 mol percent of 2,2,4,4-tetramethyl-1,3-cyclobutanediol units is required to produce a polyester that then provides a clear blend with the polyearbonate.

The glycol component of the polyester portion of the present blend contains 0 to about 10 mol percent, but preferably less than 5 mol percent of other modifying glycol units containing 3 to 16 carbon atoms. Examples of suitable modifying glycols include 1,2-propanediol, 1,3-propanediol, neopentyl glycol, 1,4butanediol, 1,5-pentanediol, 1,6-hexanediol, trans- or cis-1,4-cyclohexanedimethanol,p-xylene glycol, and mixtures thereof. The glycol component can also be modified with 0 to about 10 mol percent polyethylene glycol or polytetramethylene glycol to enhance elastomeric behavior.

The preferred polyester of the present invention is a copolyester formed from 100 mol percent terephthalic acid units, about 30 to 100 mol percent 2,2,4,4-tetramethyl-1,3-cyclobutanediol units, and about 0 to 70 mol percent ethylene glycol units. The more preferred polyester is formed from 100 mol percent terephthalic acid units, 30 to 55 mol percent 2,2,4,4-tetramethyl-1,3-cyclobutanediol units, and 45 to 70 mol percent ethylene glycol units. The most preferred polyester contains no units of other modifying dicarboxylic acids nor other modifying glycols.

The blends of the present invention are about 1 to 99 weight percent polyester portion and about 1 to 99 weight percent polycarbonate portion, with the total weight percent of the polycarbonate portion and polyester portion preferably being equal to 100 weight percent. The preferred blend of the present invention is about 20 to 99 weight percent polyester and about 1 to 80 weight percent polycarbonate, more preferably about 40 to 90 weight percent polyester and about 10 to 60 weight percent polycarbonate, even more preferably about 50 to 80 weight percent polyester and about 20 to 50 weight percent polycarbonate, with weight percents of about 60 to 70 polyester and about 30 to 40 polycarbonate being most preferred.

Greater concentrations of the polycarbonate of the blend nearer 99 weight percent produce blends having greater impact strength, heat resistance, and dimensional stability, while blends nearer 99 weight percent polyester have better chemical resistance and melt processability. The most useful blends will be those clear blends having a combination of physical properties best suited for a particular end use, as will be determined on a case by case basis.

For the polycarbonates of the invention, suitable carbonate sources for the carbonate units are preferably phosgene; dialkyl carbonate, such as preferably dibutyl carbonate; or diaryl carbonate, such as preferably diphenyl carbonate.

The inherent viscosity of the polyester portion of the blends according to the present invention is preferably at least 0.3 dL/g, more preferably at least 0.6 dL/g, determined at 25° C. in 60/40 wt/wt phenol/tetrachloroethane.

The blend compositions of the present invention are clear. The term "clear" is defined herein as an absence of cloudiness, haziness, and muddiness, when inspected visually. The blends of the present invention also exhibit a single glass transition temperature (Tg), as determined by differential scanning calorimetry (DSC).

The chemical resistance and melt processability of the blends of the present invention are good. It is generally known that blending with a polyester improves the chemical resistance and melt processability of polycarbonates. See U.S. Pat. Nos. 4,188,314 and 4,267,096.

The polycarbonate portion of the present blend can be prepared in the melt, in solution, or by interfacial polymerization techniques well known in the art. Suitable methods include the steps of reacting a carbonate source with a diol at a temperature of about 0° C. to 315° C. at a pressure of about 0.1 to 760 mm Hg for a time sufficient to form a polycarbonate. Commercially available polycarbonates that are typically used in the present invention, are normally made by reacting an aromatic diol with a carbonate source such as phosgene, dibutyl carbonate or diphenyl carbonate, to incorporate 100 mol percent of carbonate units, along with 100 mol percent diol units into the polycarbonate. For examples of methods of producing polycarbonates, see U.S. Pat. Nos. 5,498,688, 5,494,992, and 5,489,665 which are incorporated by this reference in their entireties for all their teachings.

The polyester portion of the present invention can be made by processes known from the literature such as, for example, by processes in homogeneous solution, by transesterification processes in the melt and by two phase interfacial processes. Suitable methods include the steps of reacting one or more dicarboxylic acids with one or more glycols at a temperature of about 100° C. to 315° C. at a pressure of about 0.1 to 760 mm Hg for a time sufficient to form a polyester. See U.S. Pat. No. 3,772,405 for methods of producing polyesters.

The polyester/polycarbonate blends of the present invention can be made by methods which include the steps of blending the polycarbonate and polyester portions of the present invention at a temperature of about 25° C. to 350° C. for a time sufficient to form a clear blend composition. Suitable conventional blending techniques include the melt method and the solution-prepared method. Other suitable blending techniques include dry blending and/or extrusion.

The melt blending method includes blending the polymers at a temperature sufficient to melt the polycarbonate and polyester portions, and thereafter cooling the blend to a temperature sufficient to produce a clear blend. The term "melt" as used herein includes, but is not limited to, merely softening the polymers. For melt mixing methods generally known in the polymers art, see Mixing and Compounding of Polymers (I. Manas-Zloczower & Z. Tadmor eds., Carl Hanser Verlag publisher, N.Y. 1994).

The solution-prepared method includes dissolving the appropriate weight/weight ratio of polyester and polycarbonate in a suitable organic solvent such as methylene chloride or a 70/30 mixture of methylene chloride and hexafluoroisopropanol, mixing the solution, and separating the blend composition from solution by precipitation of the blend or by evaporation of the solvent. Solution-prepared blending methods are generally known in the polymers art.

The melt blending method is the preferred method for producing the blend compositions of the present invention. The melt method is more economical and safer than the solution-prepared method which requires the use of volatile solvents. The melt method is also much more effective in providing clear blends. Any of the clear blends of the present invention that can be prepared by solution blending can also be prepared by the melt method. However, some of the blends of the present invention can be prepared by the melt method, but not by the solution method. Any blending process which provides clear blends of the present invention is suitable. One of ordinary skill in the art will be able to determine appropriate blending methods for producing the clear blends of the present invention.

In addition to the polycarbonate and polyester portions disclosed above, the blend of the present invention can include at least one other modifying polymer. Suitable modifying polymers are those which form miscible blends with the polycarbonate and polyester portions disclosed above. Possible modifying polymers include other polycarbonates, other polyesters, polyamides, polystyrenes, polyurethanes, polyarylates, liquid crystalline polymers, vinyl polymers, and the like, or a mixture thereof. Suitable modifying polymers may be determined by one of ordinary skill in the polymers art by performing traditional miscibility tests with possible modifying polymers.

A polymer may be determined to be a suitable modifying polymer of the blend of the present invention if a clear blend is formed by: 1) blending the modifying polymer with a pre-existing blend containing the polycarbonate and polyester portions, or 2) blending the modifying polymer with the polycarbonate portion prior to the introduction of the polyester portion, or 3) blending the modifying polymer with the polyester portion prior to the introduction of the polycarbonate portion, or 4) mixing the modifying polymer, polycarbonate portion and polyester portion all together prior to blending.

The clear blends of the present invention can still be further modified by the incorporation of blend modifiers to produce performance blends which may not necessarily be clear. For example, polyamides such as nylon 6,6 from DuPont, poly(ether-imides) such as ULTEM poly(ether-imide) from General Electric, polyphenylene oxides such as poly(2,6-dimethylphenylene oxide) or poly(phenylene oxide)/polystyrene blends such as the NORYL resins from General Electric, polyesters, polyphenylene sulfides, polyphenylene sulfide/sulfones, poly(ester-carbonates) such as LEXAN 3250 poly(ester-carbonate) (General Electric), polycarbonates other than LEXAN polycarbonate from General Electric, polyarylates such as ARDEL D100 polyarylate (Amoco), polysulfones, polysulfone ethers, poly (ether-ketones) or aromatic dihydroxy compounds can be used as blend modifiers to modify properties or to reduce flammability. The aromatic dihydroxy compounds used to prepare these polymers are disclosed in U.S. Pat. No. 3,030,335 and U.S. Pat. 3,317,466.

The blends of the present invention can also contain antioxidants, conventional flame retardants such as phosphorus or halogen compounds, or fillers such as talc or mica, or reinforcing agents such as glass fiber, KEVLAR, or carbon fiber. Additives such as pigments, dyes, stabilizers, plasticizers, etc. can also be used in the polyesters, polycarbonates, and blends of the present invention to further modify the properties of the inventive blends.

The blends of the present invention are useful in producing clear articles of manufacture having improved chemical resistance and melt processability while retaining excellent mechanical properties. These blends are especially useful for making molded articles, fibers, films, and sheeting.

The following examples are intended to illustrate the present invention but are not intended to limit the reasonable scope thereof.

EXAMPLES

The inherent viscosity of the polyesters was determined in 60/40 (wt/wt) phenol/tetrachloroethane at a concentration of 0.5 g/100 mL at 25° C. The glass transition temperatures (Tg's) were determined using a DuPont 912 differential scanning calorimeter (DSC) at a scan rate of 20° C./min. The glycol content of the polyester portion of these blends was determined by proton nuclear magnetic resonance spectroscopy (NMR). Clarity was determined visually. The miscibility of the blends was determined by differential scanning calorimetry and by observation of the clarity of pressed films and molded objects.

The blends of this invention were prepared in two ways:

1) The solution-prepared method of dissolving the appropriate weight/weight ratio of polyester to polycarbonate in methylene chloride or a 70/30 mixture of methylene chloride/hexafluoroisopropanol and after complete solution was obtained, precipitating the blend with methanol.

2) The melt mixing method of dry blending the appropriate weight/weight ratio of polyester to polycarbonate and extruding the blend on a ¾-in Brabender extruder equipped with a screen pack and mixing screw at temperatures of 260–320° C.

The preparation of polycarbonates is well known in the art. See U.S. Pat. Nos. 3,030,335 and 3,317,466. The bisphenol A polycarbonate used was LEXAN, available from the General Electric Company or MAKROLON 2608, available from Miles, Inc.

The following examples illustrate the preparation of some of the polyesters used in this invention and their miscibility with bisphenol A polycarbonate.

Example 1

The blends of this example were prepared by melt mixing. Blends of bisphenol A polycarbonate with polyesters were prepared in the melt in an extruder. The blend compositions were 50 percent weight polycarbonate and 50 percent weight polyester. The polycarbonate used was MAKROLON 2608, available commercially from Miles, Inc. The pellets were first mixed by tumbling. The blends were prepared in the melt in a ¾ in Brabender single screw extruder with a mixing screw. Injection molded parts were prepared on a Boy 22S injection molding machine. Processing temperatures used were in the range of 280° C. to 315° C. Visual inspection of molded parts ⅛-inch thick was used to determine clarity, and the results are presented in Table 1. Examples 1C through 1

G exhibited unexpected visual clarity. Note that the clear blends of Examples 1F and 1G (melt blended) have the same compositions as the opaque, solution blended Examples 2G and 2I. This difference is believed to be due to the more intensive mixing which is achieved in the melt.

Selected mechanical properties of some of the blends prepared in the melt are presented in Table 2. Examples 1F and 1G, which are compositions included in the present invention, exhibit a useful combination of clarity, high heat deflection temperature, and impact strength. The improvements in chemical resistance and melt processability were not analyzed for these Examples. However, it is generally known in the polymers art that the combination of a polycarbonate with a polyester will improve the chemical resistance and melt processability of the polycarbonate. See U.S. Pat. Nos. 4,188,314 and 4,267,096.

As will be apparent to one of ordinary skill in the art, these compositions have broad applications including the fabrication of molded articles, fibers, sheeting, or films, particularly where visual clarity is important.

TABLE 1

Melt Blends of Polyesters of Terephthalic Acid,
2,2,4,4-Tetramethyl-1,3-cyclobutanediol, and
Ethylene Glycol with Bisphenol A Polycarbonate
Blend Composition: 50/50 wt./wt. Polycarbonate/Polyester

| Example | EG, Mol % | TMCD, Mol % | Blend Clarity |
|---------|-----------|-------------|---------------|
| 1A | 100 | 0 | Cloudy |
| 1B | 76 | 24 | Cloudy |
| 1C | 66 | 34 | Clear |
| 1D | 58 | 42 | Clear |
| 1E | 49 | 51 | Clear |
| 1F | 30 | 70 | Clear |
| 1G | 0 | 100 | Clear |

EG = Ethylene Glycol in Polyester Composition.
TMCD = 2,2,4,4-tetramethyl-1,3-cyclobutanediol (68/32 trans/cis) in Polyester Composition.

TABLE 2

Selected Mechanical Properties of Melt Blends
of Polyesters of Terephthalic Acid,
2,2,4,4-Tetramethyl-1,3-cyclobutanediol, and
Ethylene Glycol with Bisphenol A Polycarbonate

| Example | 1A | 1B | 1F | 1G |
|---------|-----|-----|-----|-----|
| Blend polycarb/polyester (wt %/wt %) | 50/50 | 50/50 | 50/50 | 50/50 |
| Polyester TMCD/EG (mol %/mol %) | 0/100 | 24/76 | 70/30 | 100/0 |
| Visual Clarity | cloudy | cloudy | clear | clear |
| Heat Deflection Temp, ° C. (66 psi, 264 psi) | 97, 75 | 102, 91 | 127, 107 | 141, 119 |
| Notched Izod Impact Strength at 23° C., ft-lb/in | 1.3 | 1.3 | 2.6 | 4.8 |
| Flexural Modulus, psi | 355,000 | 334,000 | 316,000 | 332,000 |
| Flexural Strength, psi | 12,190 | 12,500 | 12,650 | 13,230 |

TMCD = 2,2,4,4-tetramethyl-1,3-cyclobutanediol (68/32 trans/cis)
EG = ethylene glycol.
Clarity determined visually.
Heat deflection temperature, at 66 and 264 psi loading, was determined according to ASTM D648.
Notched Izod Impact strength was determined according to ASTM D256.
Flexural modulus and flexural strength were determined according to ASTM D790.

Example 2

Examples 2A–2I illustrate the miscibility of 50/50 wt/wt solution-prepared blends of bisphenol A polycarbonate and a polyester formed from 100 mol percent terephthalic acid units and varying amounts of 2,2,4,4-tetramethyl-1,3-cyclobutanediol and ethylene glycol. Examples 2B and 2D illustrate solution prepared methods of making blends using different additives. Although the additives varied somewhat, the difference would have had only minimal effect on the properties measured. The results are presented in Table 3.

Example 2A (control) illustrates the immiscible blend obtained from blending bisphenol A polycarbonate with the homopolyester prepared from 100 mol percent terephthalic acid and 100 mol percent ethylene glycol (PET 7352, with Tg of 80° C., and inherent viscosity of 0.77, available from Eastman Chemical Company). The blend used for this example was made in a manner similar to Example 2B, using amounts shown in Table 3.

Example 2B (control) illustrates the immiscible blend obtained from a copolyester containing 100 mol percent terephthalic acid, 13 mol percent 2,2,4,4-tetramethyl-1,3-cyclobutanediol (68/32 trans/cis), and 87 mol percent ethylene glycol units, having a glass transition temperature of 89° C. and an inherent viscosity of 0.76.

To prepare the polyester for Example 2B, a mixture of 194.0 g (1.0 mol) dimethyl terephthalate, 111.6 g (1.8 mols) ethylene glycol, 28.8 g (0.20 mol) 2,2,4,4tetramethyl-1,3-cyclobutanediol (68% trans, 32% cis), 0.044 g zinc acetate (65 ppm Zn), and 0.24 g dibutyltin diacetate (400 ppm Sn) was placed in a 1-L flask equipped with an inlet for nitrogen, a metal stirrer, and a short distillation column. The flask was placed in a Belmont metal bath already heated to 190° C. and the contents of the flask were heated at 190° C. for 3 hours, 210° C. for 1.5 hours, and at 260° C. for 30 minutes. A vacuum of 0.5 mm was gradually applied over the next 3–5 minutes and after 10 minutes the temperature was raised to 280° C. Full vacuum was maintained for a total time of about 45 minutes. A high melt viscosity, amber polymer was obtained with a glass transition temperature of 89° C. and an inherent viscosity of 0.76.

The polyester was then ground to pass a 3-mm screen and 0.25 g of the polyester was dissolved in a 70/30 mixture of methylene chloride/hexafluoroisopropanol with 0.25 g MAKROLON 2608 polycarbonate (Miles). After solution was complete, the polymers were precipitated by dropping the blend solution into methanol. The precipitate which formed was collected, dried in a vacuum oven for 72 hours at 50° C., and determined to have two glass transition temperatures at 91° C. and 134° C. The blend was then melted and pressed into a thin film. After cooling to room temperature, the film appeared opaque to the eye. The results are shown in Table 3.

Example 2C (control) is yet another example of an immiscible blend. The polymer and blend used for this example were made in a manner similar to Example 2B, using amounts shown in Table 3.

Example 2D illustrates the clear, miscible blend obtained from a polyester containing 100 mol percent terephthalic acid, 34 mol percent 2,2,4,4-tetramethyl-1,3-cyclobutanediol (68/32 trans/cis), and 66 mol percent ethylene glycol units, having a glass transition temperature of 105° C. and an inherent viscosity of 0.77.

To prepare the polyester, a mixture of 97.0 g (0.50 mol) dimethyl terephthalate, 36.0 g (0.25 mol) 2,2,4,4-tetramethyl-1,3-cyclobutanediol (68% trans, 32% cis), 46.5 g (0.75 mol) ethylene glycol, 0.065 g titanium tetraisopropoxide (100 ppm Ti), and 0.11 g IRGANOX 1010 was placed in a 500-mL flask equipped with an inlet for nitrogen, a metal stirrer, and a short distillation column. The flask was placed in a Belmont metal bath already heated to 190° C. The contents of the flask were heated at 190° C. for 3.25 hours, 220° C. for 0.75 hour, 240° C. for 1.0 hour and 12 minutes at 260° C. A vacuum of 0.5 mm was gradually applied over the next 3–5 minutes and after 20 minutes the temperature was raised to 280° C. for 35 minutes. Full vacuum was maintained for a total time of about 55 minutes. A high melt viscosity, light amber polymer was obtained with a glass transition temperature of 105° C. and an inherent viscosity of 0.77.

The polyester was ground to pass a 3-mm screen and 0.25 g of the polyester was dissolved in methylene chloride with 0.25 g MAKROLON 2608 polycarbonate (Miles). After solution was complete, the polymers were precipitated by dropping the blend solution into methanol. The precipitate was collected, dried in a vacuum oven for 72 hours at 50° C., and determined to have a single glass transition temperature of 119° C. The blend was melted and pressed into a thin film. After cooling to room temperature, the film appeared clear to the eye. The results are shown in Table 3.

Examples 2E–2I shown in Table 3 further illustrate blends of bisphenol A polycarbonate and polyester. These examples were all prepared and tested in a manner similar to Examples 2B and 2D above, using the amounts shown in Table 3. Examples 2E and 2F illustrate unexpectedly clear, miscible blends. Examples 2G, 2H, and 2I were all opaque, yet were within the scope of the present invention. These examples show that when the amount of 2,2,4,4-tetramethyl-1,3-cyclobutanediol in the polyester is increased above the even more preferred range of about 30 to 60 mol percent that a more intensive mixing of the polymers is required in order to obtain a clear blend. However, Example 1 shows that blends similar in composition to those of Examples 2G, 2H, and 2I were clear when prepared by the melt method. See Examples 1F and 1G.

Examples 2A–2I above show that clear blends of the present invention can be prepared by solution blending of the bisphenol A polycarbonate portion with the polyester portion. However, the solution prepared blends of Example 2 were not clear over as broad of a range of polyester compositions as were the blends shown in Example 1, which were prepared by the melt-mixing method. Thus, melt blending is the preferred blending method.

The invention has been described in detail with particular reference to preferred embodiments thereof, but it will be understood that variations and modification can be effected within the spirit and scope of the invention. Moreover, all patents, patent applications (published and unpublished, foreign or domestic), literature references or other publications noted above are incorporated herein by reference for any disclosure pertinent to the practice of this invention.

TABLE 3

Solution Prepared Blends of Polyesters of Terephthalic Acid, 2,2,4,4-Tetramethyl-1,3-cyclobutanediol, and Ethylene Glycol with Bisphenol A Polycarbonate
Blend Composition: 50 wt. % Polycarbonate/50 wt. % Polyester

| | Polyester Composition[a] | | Blend Visual | DSC |
|---|---|---|---|---|
| Example | EG, Mol % | TMCG, Mol % | Clarity | Numer of Tgs |
| 2A | 100 | 0 | Opaque | Two |
| 2B | 87 | 13 | Opaque | Two |
| 2C | 72 | 28 | Opaque | Two |
| 2D | 66 | 34 | Clear | One |
| 2E | 58 | 42 | Clear | One |

TABLE 3-continued

Solution Prepared Blends of Polyesters of Terephthalic Acid, 2,2,4,4-Tetramethyl-1,3-cyclobutanediol, and Ethylene Glycol with Bisphenol A Polycarbonate
Blend Composition: 50 wt. % Polycarbonate/50 wt. % Polyester

| | Polyester Composition[a] | | Blend Visual | DSC |
|---|---|---|---|---|
| Example | EG, Mol % | TMCG, Mol % | Clarity | Numer of Tgs |
| 2F | 49 | 51 | Clear | One |
| 2G | 30 | 70 | Opaque | — |
| 2H | 16 | 84 | Opaque | — |
| 2I | 0 | 100 | Opaque | Two |

[a]TMCD = 2,2,4,4-tetramethyl-1,3-cyclobutanediol (68/32 trans/cis), EG = ethylene glycol.

Example 3

This Example shows two melt-prepared blends within the compositional scope of the present invention which were found not to be clear. These blends contained the 100 mol percent 2,2,4,4-tetramethyl-1,3-cyclobutanediol homopolyester. The results are shown in Table 4. Examples 3A and 3B were prepared in a manner similar to Example 2G, except that the polycarbonate to polyester blend ratios were changed.

TABLE 4

Selected Mechanical Properties of Melt Blends Polyesters of Terephthalic Acid and 2,2,4,4-Tetramethyl-1,3-cyclobutanediol with Bisphenol A Polycarbonate

| Example | 3A | 3B | 2G |
|---|---|---|---|
| Blend polycarb/polyester (wt %/wt %) | 65/35 | 85/15 | 50/50 |
| Polyester TMCD/EG (mol %/mol %) | 100/0 | 100/0 | 100/0 |
| Visual Clarity | opaque | opaque | clear |
| Heat Deflection Temp, ° C. (66 psi, 264 psi) | 136, 122 | 136, 120 | 141, 119 |
| Notched Izod Impact Strength at 23° C., ft-lb/in | 3.3 | 9.0 | 4.8 |
| Flexural Modulus, psi | 346,000 | 357,000 | 332,000 |
| Flexural Modulus, psi | 13,140 | 13,610 | 13,230 |

TMCD = 2,2,4,4-tetramethyl-1,3-cyclobutanediol (68/32 trans/cis)
Clarity determined visually.
Heat deflection temperature, at 66 and 264 psi loading, was determined according to ASTM D648.
Notched Izod Impact strength was determined according to ASTM D256.
Flexural modulus and flexural strength were determined according to ASTM D790.

We claim:

1. A blend composition comprising:
   (A) from 1 to 99 percent by weight of a polycarbonate comprising a diol component comprising from 90 to 100 mol percent 4,4'-isopropylidenediphenol units and from 0 to 10 mol percent modifying diol units having 2 to 16 carbons, wherein the total mol percent of diol units is equal to 100 mol percent; and
   (B) from 1 to 99 percent by weight of a polyester comprising
      (a) a dicarboxylic acid component comprising from 80 to 100 mol percent dicarboxylic acid units selected from the group consisting of terephthalic acid units, isophthalic acid units, and mixtures thereof; and from 0 to 20 mol percent modifying dicarboxylic acid units having about 2 to 20 carbons, wherein the total mol percent of dicarboxylic acid units is equal to 100 mol percent; and (b) a glycol component comprising from 30 to 99 mol percent 2,2,4,4-tetramethyl-1,3-cyclobutanediol units, from 1 to 70 mol percent ethylene glycol units, and from 0 to 10 mol percent modifying glycol units having from 3 to 16 carbons, wherein the total mol percent of glycol units is equal to 100 mol percent;

wherein the total units of said polyester is equal to 200 mol percent;

wherein said blend is clear and the total weight percent of said polycarbonate (A) and said polyester (B) is equal to 100 weight percent.

2. The composition of claim 1 wherein said polycarbonate (A) is present at from 1 to 80 weight percent, based on the weight of the blend composition, and said polyester (B) is present at from 20 to 99 weight percent, based on the weight of the blend composition.

3. The composition of claim 2 wherein said polycarbonate (A) is present at from 10 to 60 weight percent, based on the weight of the blend composition, and said polyester (B) is present at from 40 to 90 weight percent, based on the weight of the blend composition.

4. The composition of claim 3 wherein said polycarbonate (A) is present at from 20 to 50 weight percent, based on the weight of the blend composition, and said polyester (B) is present at from 50 to 80 weight percent, based on the weight of the blend composition.

5. The composition of claim 3 wherein said polycarbonate (A) is present at from 30 to 40 weight percent, based on the weight of the blend composition, and said polyester (B) is present at from 60 to 70 weight percent, based on the weight of the blend composition.

6. The composition of claim 1 wherein said diol component of said polycarbonate contains 100 mol percent 4,4'-isopropylidenediphenol units.

7. The composition of claim 1 wherein said dicarboxylic acid component of said polyester contains 100 mol percent terephthalic acid units.

8. The composition of claim 1 wherein said dicarboxylic acid component of said polyester comprises from 70 to 100 mol percent terephthalic acid and from 0 to 30 mol percent isophthalic acid.

9. The composition of claim 7, wherein the glycol component of the polyester comprises from 30 to 55 mol percent of 2,2,4,4-tetramethyl-1,3-cyclobutanediol units and from 45 to 70 mole percent ethylene glycol units.

10. The composition of claim 1 wherein said glycol component of said polyester consists essentially of 2,2,4,4-tetramethyl-1,3-cyclobutanediol units and ethylene glycol units.

11. The composition of claim 1 wherein said glycol component of said polyester is from 30 to 80 mol percent 2,2,4,4-tetramethyl-1,3-cyclobutanediol units and from 20 to 70 mol percent ethylene glycol units.

12. The composition of 9 wherein said glycol component of said polyester is from 34 to 55 mol percent 2,2,4,4-tetramethyl-1,3-cyclobutanediol units and from 45 to 66 mol percent ethylene glycol units.

13. The composition of claim 1, wherein the 2,2,4,4-tetramethyl-1,3-cyclobutanediol consists of from 50 percent cis isomer and from 50 percent trans isomer, wherein the total of the cis and trans isomer is equal to 100 mol percent.

14. The composition of claim 1 wherein said modifying dicarboxylic acid units of said polyester are selected from the group consisting of 4,4'-biphenyldicarboxylic acid; 1,4-, 1,5-, 2,6-, 2,7-naphthalenedicarboxylic acid; 4,4'-oxydibenzoic acid; trans-4,4'-stilbenedicarboxylic acid; oxalic acid; malonic acid; succinic acid; glutaric acid; adipic acid; pimelic acid; suberic acid; azelaic acid; sebacic acid; and mixtures thereof.

15. The composition of claim 1 wherein said modifying glycol units of said polyester are selected from the group consisting of 1,2-propanediol, 1,3-propanediol, neopentyl glycol, 1,4-butanediol, 1,5-pentanediol, 1,6-hexanediol, trans-1,4-cyclohexanedimethanol, cis- 1,4-cyclohexanedimethanol, p-xylene glycol, and mixtures thereof.

16. The composition of claim 1 wherein said blend composition has a single glass transition temperature.

17. The composition of claim 1 wherein said polycarbonate has an inherent viscosity of at least 0.3 dL/g at 25° C. and said polyester has an inherent viscosity of at least 0.3 dL/g at 25° C.

18. A clear article of manufacture made from the composition according to claim 1, selected from the group consisting of molded articles, fibers, films, and sheeting.

19. A clear article of manufacture made from the composition according to claim 1.

20. A method of using the blend of claim 1 to produce a clear article of manufacture comprising:

(a) blending polycarbonate (A) and polyester (B) of claim 1;

(b) before, during or after the blending, melting polycarbonate (A) and polyester (B) to form after the blending and melting, a melt blend;

(c) then cooling the melt blend to form a clear blend composition.

21. A blend composition comprising:

(A) from 1 to 99 percent by weight of a polycarbonate comprising a diol component comprising from 90 to 100 mol percent 4,4'-isopropylidenediphenol units and from 0 to 10 mol percent modifying diol units having 2 to 16 carbons, wherein the total mol percent of diol units is equal to 100 mol percent; and (B) from 1 to 99 percent by weight of a polyester comprising (a) a dicarboxylic acid component comprising from 80 to 100 mol percent dicarboxylic acid units selected from the group consisting of terephthalic acid units, isophthalic acid units, and mixtures thereof; and from 0 to 20 mol percent modifying dicarboxylic acid units having from 2 to 20 carbons, wherein the total mol percent of dicarboxylic acid units is equal to 100 mol percent; and (b) a glycol component consisting essentially of 30 to 100 mol percent 2,2,4,4-tetramethyl-1,3-cyclobutanediol units, from 0 to 70 mol percent ethylene glycol units, and from 0 to 10 mol percent modifying glycol units having from 3 to 16 carbons, wherein the total mol percent of glycol units is equal to 100 mol percent;

wherein the total units of said polyester is equal to 200 mol percent;

wherein said blend is clear and the total weight percent of said polycarbonate (A) and said polyester (B) is equal to 100 weight percent.

* * * * *